United States Patent
Patrissi et al.

(10) Patent No.: US 10,193,147 B1
(45) Date of Patent: Jan. 29, 2019

(54) LIQUID SILICON POUCH ANODE AND CELL

(71) Applicants: Charles J Patrissi, Newport, RI (US); Christian R Schumacher, Newport, RI (US); Steven P Tucker, Portsmouth, RI (US)

(72) Inventors: Charles J Patrissi, Newport, RI (US); Christian R Schumacher, Newport, RI (US); Steven P Tucker, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 35 days.

(21) Appl. No.: 15/696,426

(22) Filed: Sep. 6, 2017

(51) Int. Cl.
*H01M 2/02* (2006.01)
*H01M 4/36* (2006.01)
*H01M 10/0525* (2010.01)
*H01M 10/0567* (2010.01)
*H01M 2/16* (2006.01)
*H01M 10/0568* (2010.01)

(52) U.S. Cl.
CPC ......... *H01M 4/368* (2013.01); *H01M 2/0275* (2013.01); *H01M 2/1646* (2013.01); *H01M 10/0525* (2013.01); *H01M 10/0567* (2013.01); *H01M 10/0568* (2013.01)

(58) Field of Classification Search
CPC ............. H01M 4/368; H01M 10/0568; H01M 2/1646; H01M 2/0275; H01M 10/0525; H01M 10/0567
See application file for complete search history.

(56) References Cited

U.S. PATENT DOCUMENTS

| | | | |
|---|---|---|---|
| 2012/0058378 A1* | 3/2012 | Lee | B32B 27/08 429/127 |
| 2013/0101893 A1* | 4/2013 | Dai | H01M 10/0565 429/163 |

* cited by examiner

*Primary Examiner* — Stewart A Fraser
(74) *Attorney, Agent, or Firm* — James M. Kasischke; Michael P. Stanley

(57) ABSTRACT

An electrochemical cell includes a cathode pouch, an anode pouch, and a membrane separating the anode and cathode pouch. A lithium-based catholyte is inside the cathode pouch and between the membrane and pouch. A cathode current collector is located in contact with the catholyte. An anolyte having a silicon based lithium receiving material is between the anode pouch and the membrane. An anode current collector is located in contact with the anolyte. The volume between the anode pouch and the membrane contracts and expands in order to accommodate changes in anolyte volume during charging and discharge of the cell.

19 Claims, 1 Drawing Sheet

LIQUID SILICON POUCH ANODE AND CELL

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is a lithium ion electrochemical cell utilizing a silicon-based lithium ion receiving material.

(2) Description of the Prior Art

Silicon is a promising, but not yet widely commercialized, anode material for lithium ion rechargeable batteries. Capacity fading is a problem that can occur in silicon-based anodes during cycling, lithium insertion and deinsertion. Mitigation of this problem has long been sought and will result in improved anode cycling characteristics, higher battery capacity, and longer cycle life.

Rechargeable batteries with lithium metal anodes have been the subject of intense research since the 1960s. Lithium cells have has the highest voltage and an excellent charge capacity creating the highest specific energy of all the metallic anodes in the periodic table. A problem is that lithium metal forms dendrites during the charging process. These dendrites appear as microscopic spears on the lithium surface growing ever larger with each charge cycle. Dendrites eventually dislodge from the surface becoming inert as they lose electrical contact with the lithium anode. Loss of lithium causes decreased capacity with each charge cycle. At worst, dendrites can make a conductive bridge between the anode and cathode causing a short circuit followed by more capacity loss, localized heating, and battery fire and emission of toxic smoke.

To improve safety and cycle life, carbon has been embraced as the anode material of choice for state of the art lithium ion batteries. Carbon materials act as hosts for lithium atoms which easily move into and out of carbon atomic lattice during the charge and discharge processes. Carbon is a layered material with enough space between the layers to accommodate lithium ions without a significant change in volume. During lithium insertion, electrons fill the electron band structure of the carbon.

The driving force for the galvanic discharge reaction is the change in chemical potential of lithium from anode to cathode. Use of carbon gives long cycle life and safety by eliminating lithium surface plating and dendrite formation. The downside is that the charge storage capacity of carbon is much lower than for lithium metal, 360 mAh/g for carbon as compared with 3860 mAh/g for lithium). Using carbon provides safety and long cycle life but negatively impacts specific energy (Wh/mass) and energy density (Wh/volume). The chemical formula for the reversible insertion of lithium in carbon is $C_6 + xLi + xe^- \leftrightarrow Li_xCF_6$.

Polycrystalline silicon can also function as a host for lithium metal, and it has over 5× the charge storage capacity of carbon used in state of the art rechargeable lithium batteries. The reported charge storage capacity for commercially available silicon is approximately 2350 mAh/g compared to a maximum of 360 mAh/g for carbon. The volumetric capacities are 5480 and 792 mAh/l for silicon and carbon, respectively. Silicon therefore has significantly higher energy density than carbon along with good safety characteristics and it is one of the most abundant (low cost) and environmentally friendly materials on earth. The problem arises because, unlike carbon, there is no room in the silicon lattice for lithium ions. Silicon forms an alloy with lithium (at voltages near that of lithium) and the particles swell as lithium inserts into the silicon atomic lattice. During lithium insertion ("charging") silicon swells by over 400% and decreases in volume by the same amount during lithium deinsertion {"discharge"). This volume change also occurs with other potential lithium alloy materials such as gallium and tin. Silicon-based solid state anodes are typically composed of small particles of silicon, carbon (for electrical conductivity), and a polymeric binder. The ingredients are mixed and pressed onto a metal foil current collector (typically copper). Silicon has poor electrical conductivity (high resistance) therefore intimate contact with carbon is essential for facile electron flow through the anode matrix. Swelling and shrinking forces the particles to move, disrupting the connection between the particles and also between the particles and the current collector, causing increased anode resistance and decreased anode charge capacity with each charge and discharge cycle.

As a result of this swelling issue, silicon has not been widely used in lithium secondary batteries.

SUMMARY OF THE INVENTION

It is a first object of the present invention to provide a silicon-based electrochemical cell having increased capacity and longer life.

Another object is to provide an electrochemical cell that is capable of utilizing silicon and silicon-based alloys as a lithium ion receiving material.

Yet another object is to provide an electrochemical cell that is capable of accommodating changing anolyte volumes during charging and charging of a lithium ion cell utilizing a silicon-based lithium ion receiving material.

Accordingly, there is provided an electrochemical cell that includes a cathode pouch, an anode pouch, and a membrane separating the anode and cathode pouch. A lithium-based catholyte is inside the cathode pouch and between the pouch and membrane. A cathode current collector is located in contact with the catholyte. An anolyte having a silicon based lithium receiving material is inside the anode pouch, between the anode current collector and the membrane. An anode current collector is located in contact with the anolyte. The volume of the anode pouch contracts and expands in order to accommodate changes in anolyte volume during charging and discharge of the cell.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
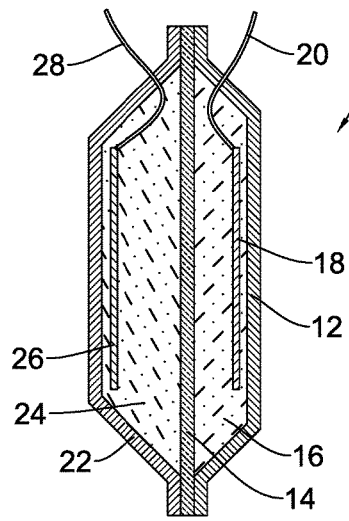
FIG. 1 is a cross-sectional diagram of a first embodiment of a lithium ion cell when charged.

In FIG. 1, there is shown a cross-sectional diagram of a charged electrochemical cell 10A. Cell 10A includes a cathode pouch 12 joined to a ceramic membrane 14. A catholyte 16 is contained between cathode pouch and membrane 14. A cathode current collector 18 is positioned in cathode pouch 12 in electrical communication with catholyte 16. Cathode current collector 18 is joined to a positive power lead 20. Cathode pouch 12 is sealed to membrane 14 to prevent leakage of the catholyte 16.

Figure 2:
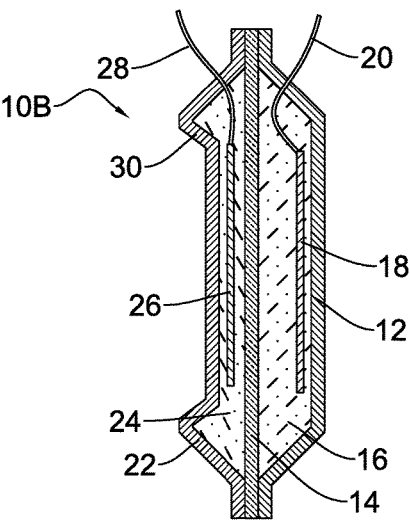
FIG. 2 is a cross-sectional diagram of a first embodiment of a lithium ion cell when discharged.

An anode pouch 22 is joined to the opposite side of the ceramic membrane 14 from the cathode pouch 12. An anolyte 24 is contained between anode pouch 22 and membrane 14. Membrane 14 and anode pouch 22 are sealed against leakage of anolyte 24. An anode current collector 26 is positioned between membrane 14 and anode pouch 22 in electrical contact with anolyte 24. A negative power lead 28 is electrically joined to anode current collector 26. FIG. 2 shows the electrochemical cell 10B which is cell 10A of FIG. 1 after discharge of the cell.

Cathode pouch 12 is made from a material that is suitable for containing catholyte 16 in a lithium ion cell. This could be a layered aluminum laminate as is known in the art. This pouch 12 can be rigid or flexible because catholyte 16 does not significantly expand or contract. Catholyte 16 typically includes a lithium-based material which could be a $LiCoO_2$ in communication with a typical electrolyte material for use with lithium ion batteries such as a carbonate, an ether based solvent and one or more lithium containing salts such as LiPF6, LiTFSI or the like. Other commonly used lithium ion cathode materials include Lithium Nickel Manganese Cobalt Oxide ("NMC", $LiNi_xMn_yCo_zO_2$), Lithium Manganese Oxide ("LMO", $LiMn_2O_4$), Lithium Iron Phosphate ("LFP", $LiFePO_4$), Lithium Nickel Cobalt Aluminum Oxide ("NCA", $LiNiCoAlO_2$), Vanadium Pentoxide ($V_2O_5$), Manganese Oxide ($MnO_2$), and Silver Vanadium Oxide (Ag: $V_4O_{11}$). This could also be an ionic liquid alone or mixed with a typical lithium battery electrolyte solvent. Cathode current collector 18 can be made from nickel; however, other high conductivity metals and alloys can be used for this such as gold, silver, platinum, alloys of these elements or the like.

Ceramic membrane 14 can be any membrane allowing transport of lithium ions from catholyte 16 to anolyte 24. Ceramic membrane 14 is preferably a nonporous lithium ion conductive ceramic such as that made by Ohara Corporation of Rancho Santa Margarita, Calif. Garnet membranes and others having similar characteristics are also an option. Nonporous membranes offer the advantage of preventing liquid crossover between the anode and cathode but typically have higher resistance than porous membranes; however, porous membranes could work.

Anode pouch 22 can be made from the same material as cathode pouch 12, but it must be flexible to accommodate expansion and contraction of anolyte 24. In one embodiment, anode pouch 22 is made with indentation regions 30 that allow expansion and contraction of the volume between membrane 14 and anode pouch 22. FIG. 1 shows the expanded configuration in which anode pouch 22 is expanded to accommodate the swollen silicon particles in the charged state, allowing a larger volume of anolyte 24. FIG. 2 shows the collapsed configuration as silicon contracts during charging, reducing the anolyte volume as ions are discharged from anolyte 24. This expansion and contraction occurs as lithium ions move to the anode or cathode particles, respectively under the influence of the electric field. become inculcated in the anolyte or as the lithium ions are discharged to the catholyte. Collapse and expansion at indentation regions 30 must occur at pressures appropriate for the other components of the cell such as the seal between anode pouch 22 and membrane 14.

Anolyte 24 is preferably a silicon based slurry that can expand and contract within anode pouch 22. The slurry has redox active silicon for cell voltage and charge storage capacity. Conductive particles are included for electron conduction through the slurry. The slurry further includes a non-aqueous solvent and a lithium conducting electrolyte for transmitting the lithium ions. A rheological modifier may be needed to adjust the slurry's viscosity insuring that particles are prevented from settling and allowing proper flow during expansion and contraction.

Optimizing the functionality of these anolyte components gives the following volume percentages. The lithium ion insertion material should have a volume percentage of between 10 and 45%. This material can be silicon powder, a silicon and carbon alloy, or an alloy of silicon and another lithium ion insertion material such as tin or gallium. The liquid electrolyte should have a volume percentage of between 25 and 50%. As in the catholyte, the liquid electrolyte can be composed of a carbonate or ether based solvent having lithium containing salts. Ionic liquids can also be mixed with these solvents. The conductive particles can be carbon such as carbon black or graphite. These particles can also be metals such as copper, nickel, silver, gold, platinum or the like. Conductive particles can have a volume percentage of between 0.5% and 15% in the slurry. The rheological modifier can have a volume percentage between 0.5 and 5%. One acceptable rheological modifier is carbon black; however, additional research may find other modifiers. To reduce viscosity more liquid can be added.

Anode current collector 26 can be made from copper, nickel or another highly conductive material. Anode current collector 26 should be in contact with anolyte 24 to reduce electrical resistance. It may be desirable to affix anode collector 26 to anode pouch 22 to allow it to move with pouch 22; however, it is believed that this may impede collapse of pouch 22.

During discharge from cell 10A shown in FIG. 1, as electrons are utilized from negative electrode 28, lithium ions in anolyte 24 travel across membrane 14 to join catholyte 16. As these ions leave anolyte 24, anolyte 24 decreases in volume. The reduction of volume creates a lower pressure between anode pouch 22 and membrane 14. This lower pressure causes anode pouch 22 to collapse at indentation regions 30 reducing the contained volume.

As cell 10B shown in FIG. 2 is charged, lithium ions in catholyte 16 travel across membrane 14. Discharge of these ions from catholyte 16 doesn't significantly change the volume between cathode pouch 12 and membrane 14. On the anode side of membrane 14, lithium ions become part of the silicon slurry anolyte 24, causing expansion of the anolyte volume. This expansion creates a higher pressure in the volume enclosed between anode pouch 22 and membrane 14 that pushes anode pouch 22 outward. Outward expansion of anode pouch 22 is allowed by indentation regions 30.

Figure 3:
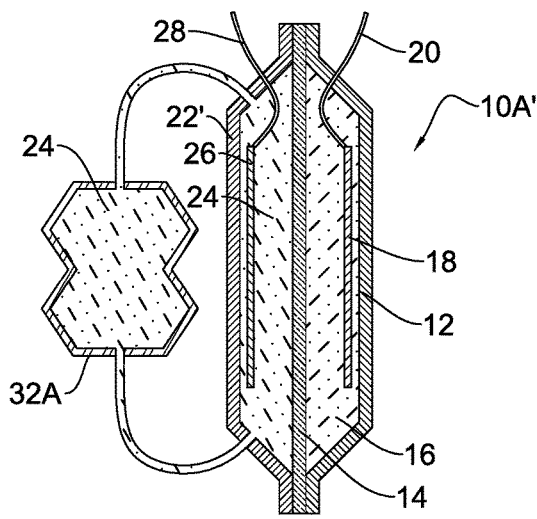
FIG. 3 is a cross-sectional diagram of a second embodiment of a lithium ion cell when charged.
Figure 4:
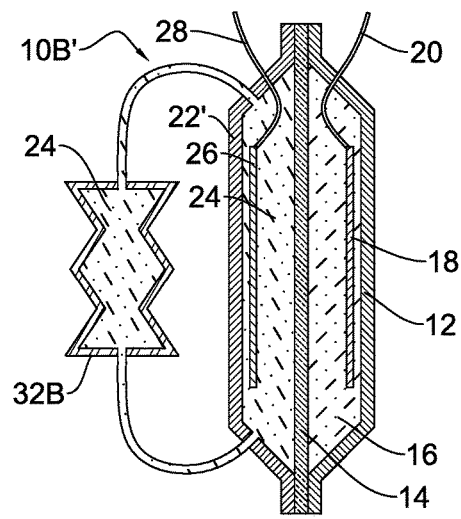
FIG. 4 is a cross-sectional diagram of a second embodiment of a lithium ion cell when discharged.

FIG. 3 and FIG. 4 show an alternate embodiment. FIG. 3 shows the embodiment with cell 10A' in a charged state, and FIG. 4 shows the embodiment with cell 10B' in a discharged state. Anode pouch 22' is made from a rigid material that is capable of withstanding the pressures caused by expansion and contraction of anolyte 24 contained therein. A reservoir 32A is provided in communication with the volume between anode pouch 22' and membrane 14. In its charged state, reservoir 32 is expanded to contain a larger volume of anolyte 24.

FIG. 4. shows embodiment with a cell 10B' in a discharged state. Reservoir 32B contracts as anolyte 24 reduces in volume while cell is discharging. Anolyte 24 travels from reservoir 32B to the volume between anode pouch 22' and membrane 14. Reservoir 32A and 32B can be made from any design or material capable of expanding and contracting to support changes in anolyte 24 volume. It should not be limited to the particular design shown.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. An electrochemical cell comprising:
   a cathode pouch;
   a membrane having a first side sealed against said cathode pouch and defining a cathode volume therebetween and a second side, said membrane allowing communication of lithium ions between the first and second sides;
   a catholyte positioned in said cathode volume, said catholyte comprising a lithium bearing material and an electrolyte;
   a cathode current collector positioned within said cathode volume in electrical communication with said catholyte for providing a positive electrical charge on discharge of the electrochemical cell;
   an anode pouch sealed against said membrane second side and defining an anode volume therebetween wherein said anode volume is responsive to pressure changes therein;
   an anolyte positioned in said anode volume, said anolyte comprising a silicon-based lithium ion insertion material, an electrolyte, and conductive particles; and
   an anode current collector positioned within said anode volume in electrical communication with said anolyte for providing a negative electrical charge on discharge of the electrochemical cell.

2. The apparatus of claim 1 wherein said anolyte more specifically comprises:
   a silicon-based lithium insertion material having a volume percentage of between 10% and 45%;
   a liquid electrolyte having a volume percentage of between 25% and 50%;
   conductive particles having a volume percentage of between 0.5% and 15%; and
   a rheological modifier having a volume percentage of between 0.1% and 15%.

3. The apparatus of claim 2 wherein said silicon-based lithium insertion material comprises at least one of the following materials: silicon powder, a silicon and carbon alloy, a silicon and tin alloy, and a silicon and gallium alloy.

4. The apparatus of claim 1 wherein said catholyte comprises a lithium insertion material and an electrolyte.

5. The apparatus of claim 4 wherein said lithium insertion material is lithium metal.

6. The apparatus of claim 4 wherein said lithium insertion material is $LiCoO_2$.

7. The apparatus of claim 1 wherein said catholyte comprises:
   an electrolyte; and
   at least one material selected from the following materials: $LiCoO_2$, $LiNi_xMn_yCo_zO_2$, $LiMn_2O_4$, $LiFePO_4$, $LiNiCoAlO_2$, $V_2O_5$, $MnO_2$, and $Ag_2V_4O_{11}$.

8. The apparatus of claim 1 wherein said anode pouch and membrane defined anode volume is capable of expanding to accommodate anolyte having a larger volume when the cell is charged and is capable of contracting to accommodate anolyte having a smaller volume when the cell is discharged.

9. The apparatus of claim 8 wherein said anode pouch has shoulders that allow expansion and contraction of said anode pouch to create the larger anode volume and the smaller anode volume.

10. The apparatus of claim 9 wherein said anode current collector is joined to said anode pouch to maintain a position during expansion and contraction of said anode pouch.

11. The apparatus of claim 8 wherein said anode pouch has a variable volume reservoir in communication with the anode volume to accommodate anolyte expansion and contraction.

12. The apparatus of claim 1 wherein said membrane comprises a ceramic membrane.

13. An anode for use with a lithium ion cathode and membrane comprising:
    an anode pouch sealed against the membrane on the side opposite the cathode and defining an anode volume between said anode pouch and the membrane wherein said anode volume is responsive to pressure changes therein;
    an anolyte positioned in said anode volume, said anolyte comprising a silicon-based lithium ion insertion material, an electrolyte, and conductive particles; and
    an anode current collector positioned within said anode volume in electrical communication with said anolyte.

14. The apparatus of claim 13 wherein said anolyte more specifically comprises:
    a silicon-based lithium insertion material having a volume percentage of between 10% and 45%;
    a liquid electrolyte having a volume percentage of between 25% and 50%;
    conductive particles having a volume percentage of between 0.5% and 15%; and
    a rheological modifier having a volume percentage of between 0.1% and 15%.

15. The apparatus of claim 14 wherein said silicon-based lithium insertion material comprises at least one of the following materials: silicon powder, a silicon and carbon alloy, a silicon and tin alloy, and a silicon and gallium alloy.

16. The apparatus of claim 13 wherein said anode pouch and membrane defined anode volume is capable of expanding to accommodate anolyte having a larger volume when charged and is capable of contracting to accommodate anolyte having a smaller volume when discharged.

17. The apparatus of claim 16 wherein said anode pouch has shoulders that allow expansion and contraction of said anode pouch to create the larger anode volume and the smaller anode volume.

18. The apparatus of claim 17 wherein said anode current collector is joined to said anode pouch to maintain a position during expansion and contraction of said anode pouch.

19. The apparatus of claim 16 wherein said anode pouch has a variable volume reservoir in communication with the anode volume to accommodate anolyte expansion and contraction.

* * * * *